(12) United States Patent
White et al.

(10) Patent No.: US 7,733,798 B2
(45) Date of Patent: Jun. 8, 2010

(54) EVALUATION OF NETWORK DATA AGGREGATION

(75) Inventors: Russell White, Holly Springs, NC (US);
Alvaro Retana, Raleigh, NC (US);
Bruce Pinsky, San Jose, CA (US); John Cavanaugh, Raleigh, NC (US);
Mosaddaq Turabi, Peoria, IL (US)

(73) Assignee: Cisco Technology, Inc., San Jose, CA (US)

( * ) Notice: Subject to any disclaimer, the term of this patent is extended or adjusted under 35 U.S.C. 154(b) by 279 days.

(21) Appl. No.: 11/846,072

(22) Filed: Aug. 28, 2007

(65) Prior Publication Data

US 2009/0059925 A1 Mar. 5, 2009

(51) Int. Cl.
*H04L 12/26* (2006.01)
(52) U.S. Cl. ..................................... 370/252
(58) Field of Classification Search ................. 370/252
See application file for complete search history.

(56) References Cited

U.S. PATENT DOCUMENTS

| 6,473,431 | B1 | 10/2002 | Perlman et al. |
| 6,721,344 | B2 | 4/2004 | Nakao et al. |
| 6,826,621 | B1 | 11/2004 | Kephart et al. |
| 6,836,465 | B2 * | 12/2004 | Rajan et al. ................. 370/238 |
| 7,190,696 | B1 | 3/2007 | Manur et al. |
| 2002/0101821 | A1 | 8/2002 | Feldmann et al. |
| 2006/0159095 | A1 | 7/2006 | Cook et al. |

OTHER PUBLICATIONS

White, R., Slice., D and Retana, A, Optimal Routing Design, Optimal Routing Design, Jun. 1, 2005, pp. 143-145, Publisher: Cisco Press, Published in: Indianapolis, IN US.

* cited by examiner

*Primary Examiner*—Huy D Vu
*Assistant Examiner*—Stephen J Clawson
(74) *Attorney, Agent, or Firm*—Hickman Palermo Truong & Becker LLP

(57) ABSTRACT

In one embodiment, a method includes receiving topology data that indicates multiple communication links and multiple intermediate network nodes in communication based on the communication links. The intermediate network nodes include multiple leaf nodes that terminate communications and multiple transit nodes that facilitate the passage of information between leaf nodes. Aggregation point data is also received, which indicates all aggregation points on the intermediate network nodes. An aggregation point is an interface between a network node and a communication link, through which is output data that is a combination of data received through multiple different interfaces upstream of the interface. A set of paths is determined for which each path in the set connects a different pair of leaf nodes. A measure of aggregation is determined based on a number of aggregated paths of the set of paths. An aggregated path passes through an aggregation point.

25 Claims, 6 Drawing Sheets

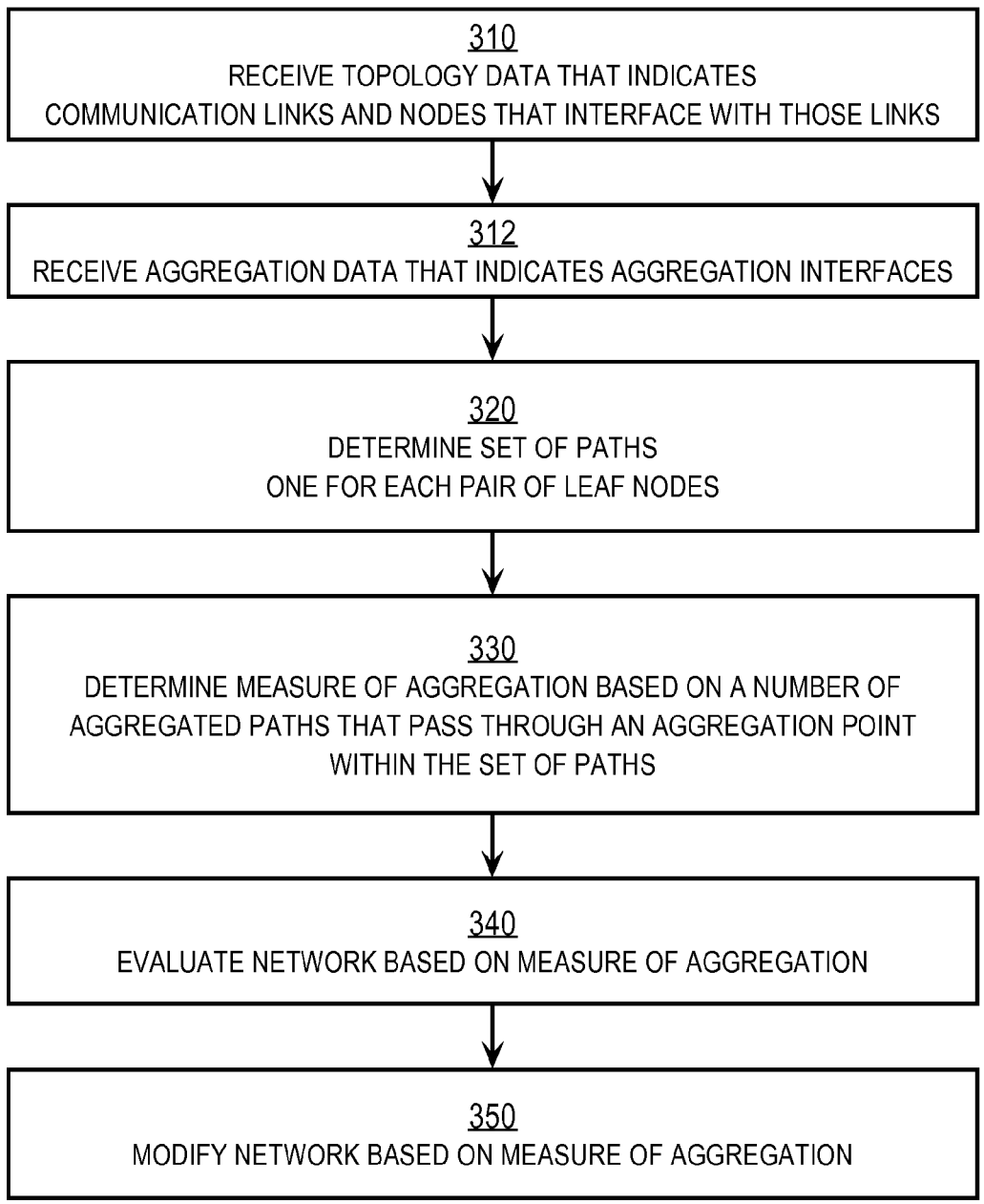

EVALUATION OF NETWORK DATA AGGREGATION

BACKGROUND OF THE INVENTION

1. Technical Field

The present disclosure relates generally to objective measures of design for communication networks.

2. Background

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a network node that is configured to originate or terminate communications over the network. An intermediate network node facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. According to internetwork protocols, each node is given a logical internetwork address and intermediate network nodes called routers track which internetwork address is reachable through which communication link. A well known internetwork protocol is the Internet Protocol (IP). Information used by the routers is distributed using one or more of several well known routing protocols. A well known routing protocol is Open Shortest Path First (OSPF) which exchanges full topology information about every node and communication link in an area.

To reduce the consumption of network resources and improve scalability, some routing protocols divide a large network up into smaller subnetworks. By aggregating routing information, the amount of network resources consumed to maintain routing data and make routing decisions can be reduced and network scalability can be enhanced. For example, OSPF divides a large network up into multiple areas and exchanges full topology information only within one area. At a boundary with a different area, address reachability data is aggregated and exchanged with an adjacent node in the different area.

The connected communications links and division of routers into areas is a manual process performed by human network administrators. As a result, the division is subjective based on the administrator's perceptions and is not guaranteed to be optimal in any objective sense. As networks become larger, sub-optimal divisions can lead to significant wasted resources and increased costs to service the same customer base for a given network. In some circumstances, sub-optimal divisions can lead to instability and lack of resiliency in the network.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates an example method to evaluate and improve data aggregation in a network; and.

DESCRIPTION OF EXAMPLE EMBODIMENTS

Figure 1A:
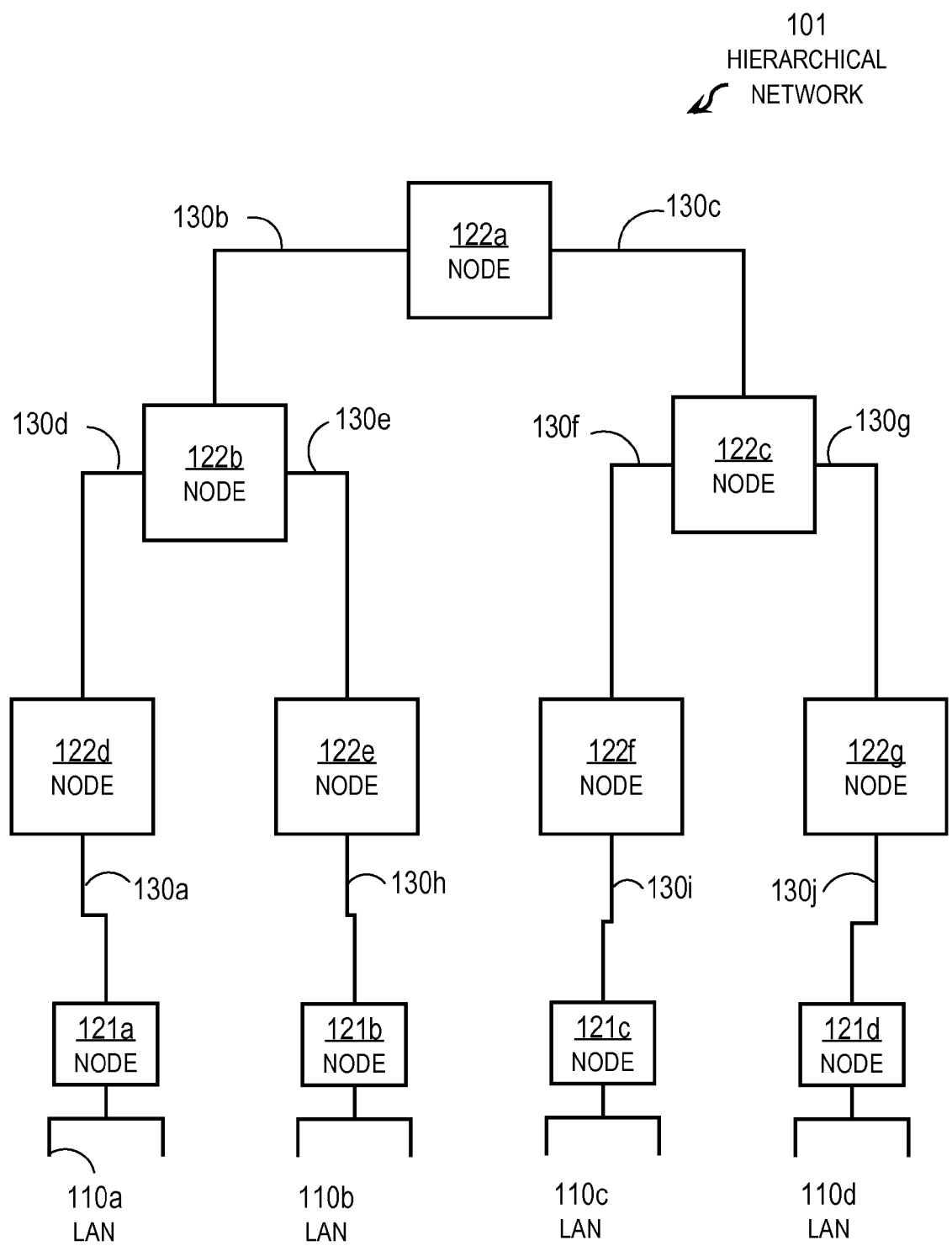
FIG. 1A illustrates an example hierarchical network.

Techniques are described for evaluation of data aggregation in a network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Applicants determined that an objective measure is desirable, which can be used to compare aggregation associated with different designs for connections among routers and division of routers into areas. Such a measure can be used to certify network designers and to evaluate the evolution of a network over time. Applicants also determined that not only is topology aggregated in network areas, but data rate and address space can also be aggregated at various points throughout a network and such aggregation should also be measured.

Embodiments of the invention are described in the contexts of routers that perform data rate aggregation, topology aggregation or address space aggregation, or some combination, in a communications network. However, the invention is not limited to these contexts. In other embodiments, other aggregation can be performed on data passed through an interface of the same or different intermediate network nodes, such as hubs and bridges. For example, in various embodiments, network cost data, such as noise, travel time, travel time variability (jitter), is aggregated, and non routing data, such as data packet payload data, is aggregated in a communications network.

1.0 Overview

In one set of embodiments, a method includes receiving topology data that indicates multiple communication links and multiple intermediate network nodes in communication based on the communication links. The nodes include multiple leaf nodes that terminate communications and multiple transit nodes that facilitate the passage of information between leaf nodes. Aggregation point data is also received. Aggregation point data indicates all aggregation points on the intermediate network nodes. An aggregation point is an interface between a network node and a communication link, through which is output data that is a combination of data received through multiple different interfaces upstream of the interface. A set of paths is determined for which each path in the set connects a different pair of leaf nodes. A measure of aggregation is determined based on a number of aggregated paths of the set of paths. An aggregated path passes through an aggregation point.

In other embodiments, an apparatus, or logic encoded in one or more tangible media, or instructions encoded on one or more computer-readable media is configured to perform one or more steps of the above method.

2.0 Network Overview

As stated above, communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information used by the protocol. Often, the data in the payload for the particular protocol includes a header and payload for a different protocol associated with a different layer of detail for information exchange. The header for a particular protocol typically indicates a type for the next protocol contained in its payload. The protocol in the payload is said to be encapsulated in the protocol of the header for the payload.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are network devices that determine which communication link or links to employ to support the progress of data packets through the network. A network node that determines which links to employ based on information in the internetwork header (layer 3) is called a router.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A link-state protocol is an example of a routing protocol, which only exchanges control plane messages used for routing data packets sent in a different routed protocol (e.g., IP). As stated in the background, to reduce the consumption of network resources and improve scalability, some routing protocols divide a large network up into smaller subnetworks. For example, the Open System Interconnection (OSI) protocol suite and the Open Shortest Path First (OSPF) routing protocol divide a network into domains and areas. A domain is a portion of a network under the network administration of a single authority, such as an enterprise or Internet service provider (ISP). A domain is also called an autonomous system (AS). A domain is divided into areas. Each area is a group of contiguous subnetworks and attached end nodes specified by a network administrator, usually manually. In OSI, routers within an AS communicate with each other using an intermediate system to intermediate system (IS-IS) protocol. According to IS-IS, routing within an area (level 1 routing) uses link-state data that distinguishes each link on each router in the area. Routing between areas (level 2 routing) goes through a level 2 router that aggregates the addresses reachable through that level 2 router. By aggregating routing information for addresses reachable over many links of a level 2 router, the amount of network resources consumed to maintain link-state data and make routing decisions can be reduced and network scalability can be enhanced. As stated in the background, the division of routers into areas is conventionally a manual process performed by human network administrators.

In an internetwork, networks in different autonomous systems (AS) also route data packets among each other. In general, the network nodes in an autonomous system are manually configured with an Autonomous System identifier (ASID). Routing information for an AS is summarized at its boundaries with one or more other ASs at intermediate network nodes called border gateway nodes or border gateway (BG) routers. Routing information shared within the borders of one AS is exchanged using an interior gateway protocol (IGP). Example IGPs include the link state protocols OSPF and IS-IS described above. Another IGP, developed by Cisco Systems of San Jose, Calif. for use in its routers, is the Enhanced Interior Gateway Routing Protocol (EIGRP).

A level 3 routing protocol is used to exchange route summary and routing policy information across AS borders. For example, the Border Gateway Protocol (BGP) is a level 3 routing protocol. The BGP sends summary and policy information between adjacent boundary gateway nodes in different ASs using the External BGP (EBGP). The BGP sends summary and policy information between different boundary gateways in the same AS using the Internal BGP (IBGP).

In general, efficient use of network resources depends on the communications links among nodes and the manually configured aggregation points. In the following, three sets of network conditions are compared in terms of their suitability for effective aggregation.

FIG. 1A illustrates an example hierarchical network 101. Network 101 include local area network (LAN) 110a, LAN 110b, LAN 110c, LAN 110d (collectively referenced herein as LAN 110), each connected to one or more end nodes (not shown). Network 101 also includes multiple intermediate network nodes, such as routers, including node 121a, node 121b, node 121c, node 121d, node 122a, node 122b, node 122c, node 122d, node 122e, node 122f and node 122g (collectively referenced herein as nodes 120). Nodes 120 include leaf nodes 121a, node 121b, node 121c, node 121d (collectively referenced herein as leaf nodes 121) and transit nodes 122a, node 122b, node 122c, node 122d, node 122e, node 122f and node 122g (collectively referenced herein as transit nodes 122). Data plane traffic enters and leaves the network of intermediate network nodes 120 at the leaf nodes 121, so the leaf nodes 121 are said to terminate communications among the intermediate network nodes 120. Within the entire network 101, communications are terminated at end nodes (not shown) on each LAN 110. By definition, any router that has a communication link with only one other router is a leaf node; however, some leaf nodes (not shown) may have communication links with multiple other routers. Leaf nodes are not used for passing traffic from one router to another and are sometimes call stub routers. Intermediate network nodes 120 that are not leaf nodes 121 are transit nodes 122. Transit nodes 122 route data traffic between leaf nodes.

Network 101 includes only direct communication link 130a, link 130b, link 130c, link 130d, link 130e, link 130f, link 130g, link 130h, link 130i and link 130j (collectively referenced herein as links 131).

A hierarchical network is one in which nodes are connected in a tree structure in which one root serves as a parent node for one or more child nodes. Each child node has only one parent node, but may have zero, one or more child nodes of its own. A child node that has no other child node is a leaf node.

Network 101 is a hierarchical network because it can be represented by a tree in which node 122a is the root node with two child nodes—node 122b and node 122c. Node 122b is parent node to node 122d and node 122e; node 122c is parent node to node 122f and node 122g. Node 122b and node 122c are in a second level of the hierarchy. Their child nodes, node 122d, node 122e, node 122f, node 122g are in the third level of the hierarchy. At the next level of the hierarchy are the leaf nodes 121. Leaf node 121a is the child of node 122d, leaf node 121b is the child node of node 122e, leaf node 121c is the child node of node 122f, leaf node 121d is the child node of node 122g.

A property of a hierarchical network is that there is only one path between any two end nodes. A path is a sequence of nodes connected by direct communication links. Communication links that lead to multiple paths between the same two end nodes are physically removed or ignored in order to generate the hierarchical network. The Spanning Tree protocol is a routing protocol that ignores communication links that violate the tree structure of a hierarchy.

An advantage of hierarchical networks is that loops are avoided. Another advantage is that hierarchical networks lend themselves readily to aggregation. Data from nodes at lower levels of the hierarchy, closer to the end nodes, can be combined or summarized and sent in combined form to nodes at higher levels, farther from the end nodes. For example, the network addresses reachable through child node 122d and child node 122e can be combined at parent node 122b and presented to root node 122a without sharing information on how the addresses are distributed between the child nodes of parent node 122b. As a result, hierarchical networks scale up to large numbers of nodes very well.

A disadvantage of hierarchical networks is that they can lead to sub-optimal routing, e.g., taking many more hops to reach a destination than is necessary. For example, it is assumed for purposes of illustration that node 122e is close enough to node 122f to form a direct connection with a communication link. If such a link were available, data packets from LAN 110b could be sent to LAN 110c by traversing only four nodes—node 121b, node 122e, node 122f and node 121c. However, to maintain the hierarchy, such a link is eliminated as long as link 130f is in place; otherwise one of node 122e and node 122f is the child of two parents. Thus traffic from LAN 110b must traverse seven network nodes—node 121b, node 122e, node 122b, node 122a, node 122c, node 122f and node 121c. A purely hierarchical network is not resilient; when a communication link that provides the best path to a destination goes down, there are no other links to use to support a path to the same destination. Quite often, network designs violate the principles of purely hierarchical design to provide some resilience.

Figure 1B:
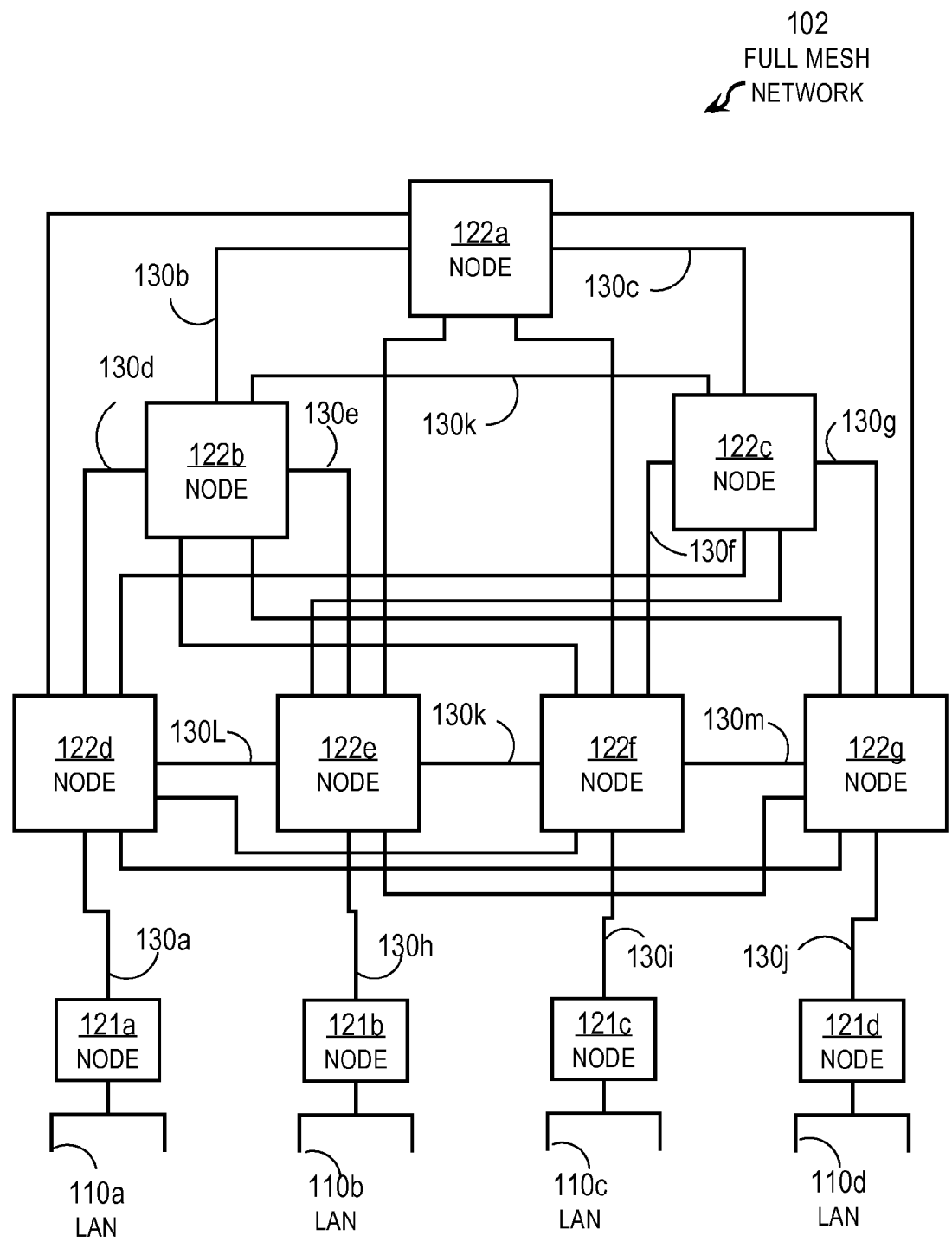
FIG. 1B illustrates an example full mesh network.

FIG. 1B illustrates an example full mesh network 102. Network 102 includes LAN 110 and nodes 120, as in network 101. However, network 102 includes a full mesh of communication links among the nodes 122 (collectively referenced herein as communication links 132), including six links between each transit node 122 and every other transit node 122. For example, in addition to the communication links 131 described in reference to FIG. 1A, network 102 communication links 132 include link 130k, link 130L, 130m, link 130n, among others.

A property of a full mesh network is that there are many paths between any two end nodes. An advantage of full mesh networks is that they always provide optimal routing, e.g., taking the fewest possible hops to reach a destination. For example, data packets from LAN 110b could be sent to LAN 110c over the direct link 130k between node 122e and node 122f, which link is not available in hierarchical network 101. Full mesh networks are also more resilient; when a communication link that provides the best path goes down, there are plenty of other links to use to support the next best path.

A disadvantage of full mesh networks is that loops are easy to form and more complex logic must be included in routing protocols to avoid loops. Another disadvantage is that full mesh networks do not lend themselves to aggregation. Many paths are available to circumvent any aggregation points. For example, it is assumed, as described above for the hierarchical network, that the network addresses reachable through node 122d and node 122e are combined at node 122b and presented to node 122a without sharing information on how the addresses are distributed between node 122d and node 122e. However, no path between any two leaf nodes 121 goes through the aggregation point on node 122b. Therefore no paths benefit from the aggregation; and the aggregation becomes superfluous. All nodes in network 102 will flood full topology data to each other. As a result, full mesh networks do not scale up to large numbers of nodes very well.

Figure 1C:
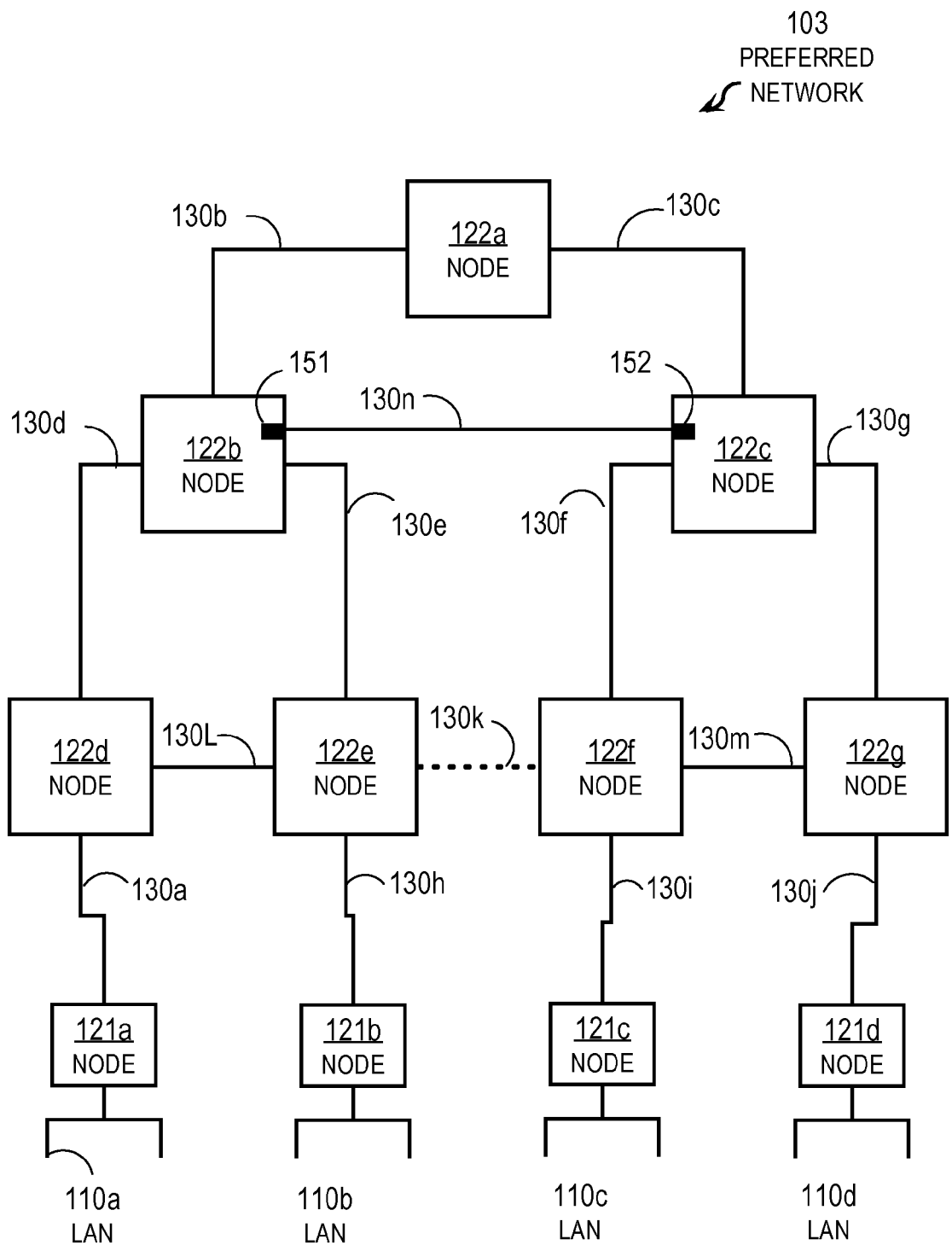
FIG. 1C illustrates an example preferred network.

FIG. 1C illustrates an example preferred network 103. Network 103 includes LAN 110 and nodes 120, as in network 101 and network 102. However, network 103 includes more communication links among the nodes 122 (collectively referenced herein as communication links 133) than the hierarchical network 101 and fewer than the full mesh network 102. In addition to the communication links 131 described in reference to FIG. 1A, network 103 communication links 133 include link 130L, 130m and link 130n. Communication link 130k (indicated by a broken line in FIG. 1C), among others, are not included. Network 103 combines the capacity to aggregate and scale well to large number of nodes offered by the hierarchical network 101 with the resiliency against link failure provided by the full mesh network 102. The effectiveness of the aggregation depends on which interfaces are used to aggregate the network data (including data plane data or control plane data or both). In the illustrated embodiment, aggregation point interface 151 is between node 122b and link 130n; and aggregation point interface 152 is between node 122c and link 130n.

Although a particular number of LAN 110, router leaf nodes 121, router transit nodes 122 and communication links 131, 132, 133 are described in references to FIG. 1A, FIG. 1B and FIG. 1C for purposes of illustration, in other embodiments networks includes more or fewer communication links, LAN, and leaf nodes and transit nodes of the same or different intermediate network node types.

Several different kinds of aggregation are possible at intermediate network nodes. In the following, three types of example aggregation are described.

Figure 2A:
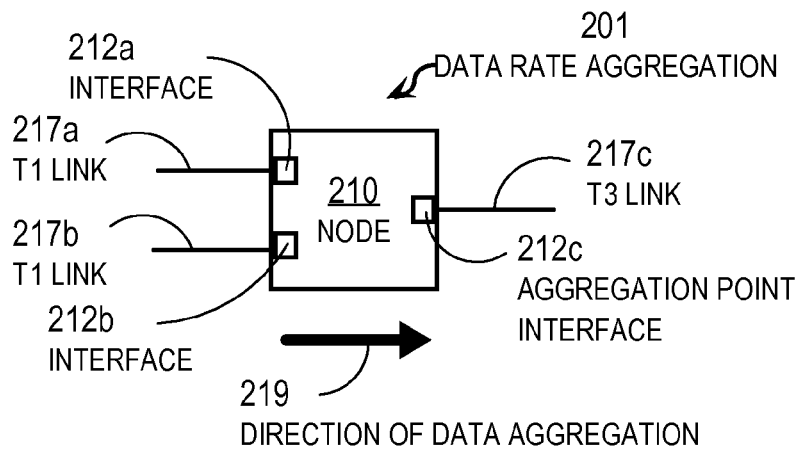
FIG. 2A illustrates example data rate aggregation through an interface of a node.

FIG. 2A illustrates example data rate aggregation 201 through an interface of a node. FIG. 2A depicts a node 210 (such as a transit node 122), communication link 217a, link 217b and link 217c (collectively referenced as links 217) connected to interface 212a, interface 212b and interface 212c, respectively, on node 210. Link 217a and link 217b are T1 communication links that support a maximum data rate of 1.544 megabits per second (Mbps, a megabit=$10^6$ binary digits called bits). Link 217*c*, however is a T3 communication link that supports a much larger maximum data rate of 44.736 Mbps. Thus T3 link 217*c* can handle all the data that can possibly come on T1 link 217*a* and link 217*b* and several other links (not shown). Data flowing out through interface 212*c* is a simultaneous combination of the data coming in through interfaces 212*a* and interface 212*b*. That is, even if data comes in at near the maximum rate, 1.5 Mbps, on both link 217*a* and link 217*b*, all that data goes out at a combined rate, 3.0 Mbps, through interface 212*c*. This type of aggregation is called data rate aggregation or physical aggregation. If link 217*c* were a T1 link, no data rate aggregation occurs on node 210, Data rate aggregation applies to both data plane data and control plane data.

Note that the aggregation is directional. Data flowing from link 217*a* and link 217*b* are aggregated onto link 217*c*. Data coming in on link 217*c* is not aggregated with data on link 217*a* or 217*b* to go out the other T1 link. The direction of data aggregation 219 is indicated by an arrow in FIG. 2A.

Note that aggregation is associated with a particular interface on the node and not with every interface on the node. Data coming in on link 217*a* and out on link 217*b* is not aggregated. Only data going out through interface 212*c* to link 217*c* is aggregated. The interface through which the aggregated data flows out is called the aggregation point. Thus, in FIG. 2A, interface 212*c* is the aggregation point for data rate aggregation on node 210.

Figure 2B:
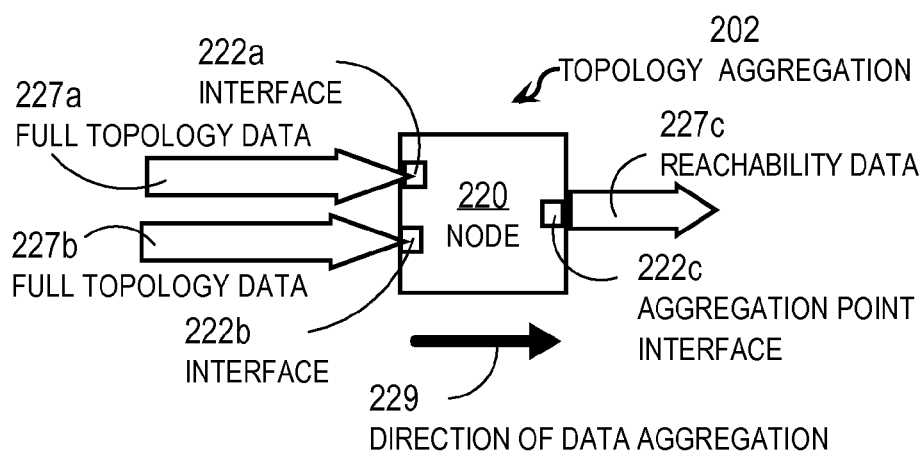
FIG. 2B illustrates example topology aggregation through an interface of a node.

FIG. 2B illustrates example topology aggregation 202 through an interface of a node. FIG. 2B depicts a node 220 (such as a transit node 122) and interface 222*a*, interface 222*b* and interface 222*c* on node 220 connected to separate communication links (not shown). Full topology data, such as is flooded in an OSPF area, is received in message 227*a* and message 227*b* through interface 222*a* and interface 222*b*, respectively. Node 220, however, performs summarization, such as is done on a level 2 router, and sends only reachability data to routers in a different area through interface 222*c* in a reachability data message 227*c*. The reachability data in message 227*c* indicates all the IP addresses described in topology data received through interfaces 222*a* and 222*b*, but does not associate those addresses with either interface 222*a* or interface 222*b* or an interface on any other node. Data flowing out through interface 222*c* is a simultaneous combination of the data coming in through interfaces 222*a* and interface 222*b*. This type of aggregation is called topology aggregation. If outgoing message 227*c* carried full topology data, then no topology aggregation occurs on node 220. Topology aggregation applies to control plane data.

As with data rate aggregation, topology aggregation is directional and associated with an aggregation point at a particular interface and not with every interface on the node. The direction of data aggregation 229 is indicated by an arrow in FIG. 2B. Interface 222*c* is the aggregation point interface on node 220. Full topology data received at interface 222*a* is output through interface 222*b* without aggregation. Similarly, full topology received at interface 222*b* is output through interface 222*a* without aggregation, In some embodiments, topology aggregation takes a different form. Instead of receiving full topology data message 227*a* and message 227*b* on interface 222*a* and interface 222*b*, respectively, one of these communication links is absent and full topology data is received on only one interface, e.g., interface 222*a*. The full topology data may indicate other nodes upstream of the node connected directly to interface 222*a* and the interfaces on those nodes. Node 220, however, still performs summarization, such as is done on a level 2 router or level 3 router; and sends only address reachability data to routers in a different domain through interface 222*c* in a reachability data message 227*c*. The reachability data in message 227*c* indicates all the IP addresses described in reachability data received through interfaces 222*a*, but does not associate those addresses with either interface 222*a* or an interface on any other node upstream of interface 222*a*.

In some embodiments, topology aggregation takes a still different form. Instead of receiving full topology data message 227*a* and message 227*b* on interface 222*a* and interface 222*b*, respectively, reachability data only is received on each interface. Node 220, however, performs summarization, such as is done on a level 3 router, and sends only reachability data to routers in a different domain through interface 222*c* in a reachability data message 227*c*. The reachability data in message 227*c* indicates all the IP addresses described in reachability data received through interfaces 222*a* and 222*b*, but does not associate those addresses with either interface 222*a* or interface 222*b* or an interface on any other node.

Figure 2C:
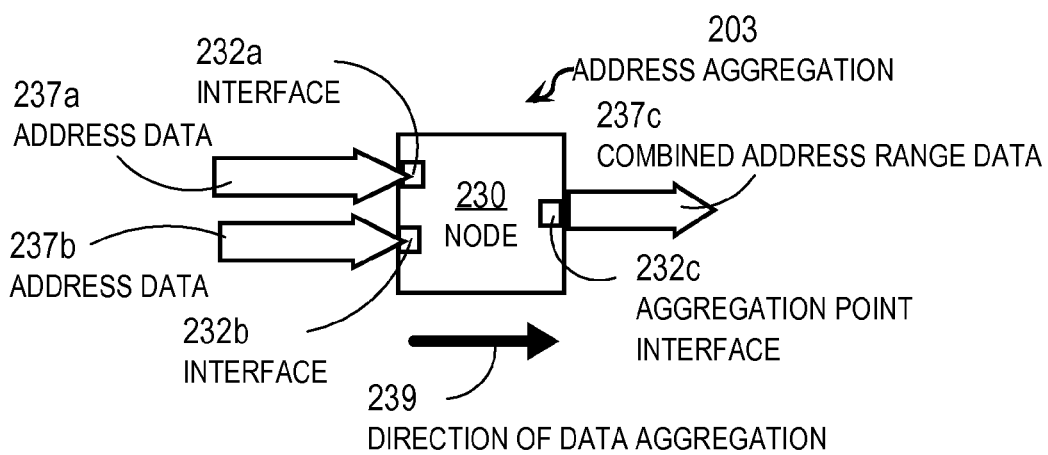
FIG. 2C illustrates example address aggregation through an interface of a node.

FIG. 2C illustrates example address aggregation 203 through an interface of a node. FIG. 2C depicts a node 230 (such as a transit node 122) and interface 232*a*, interface 232*b* and interface 232*c* on node 230 connected to separate communication links (not shown). Address data, such as is forwarded between OSPF areas in a reachability message, or within an area in a full topology message, is received in message 237*a* and message 237*b* through interface 232*a* and interface 232*b*, respectively. Node 230, however, performs address combination in which multiple hierarchical addresses or address ranges are combined into a single address range. Node 230 sends a single IP address range to represent multiple input addresses or ranges to routers in a different area or domain through interface 232*c* in a combined address data message 227*c*. The output message 237*c* can also include one or more other addresses or address ranges that represent other combined or uncombined addresses or ranges.

Certain types of addresses are well suited for combining in a single range. For example, IPv4 addresses are 32 bits. An octet is eight bits that can represent decimal values from 0 through 255. If contiguous IPv4 addresses are assigned to end nodes on one or more neighboring LANs, those addresses will likely be reachable through the same interface at some point downstream in the direction of data flow. Contiguous IPv4 addresses can be combined in a single range.

IPv4 addresses are often expressed as four decimal values separated by dots, e.g., 10.1.0.0. A range of IP addresses are expressed by a base value followed by a slash and mask number. The mask number indicates the number of most significant bits that remain constant throughout the range. Thus a range of 255 contiguous IPv4 addresses is 10.1.0.0/24. During address aggregation, the address data indicting addresses 10.1.0.0/24 and 10.1.1.0/24 are combined into the single range 10.1.0.0/23. This type of aggregation is called address aggregation.

If outgoing message 237*c* carried the same list of separate addresses or address ranges as received in address data 237*a* and 237*b*, then no address aggregation occurs on node 230. If two or more addresses or address ranges are combined into a single range in combined address range data message 237*c*, then address aggregation is occurring. Address aggregation applies to control plane data.

As with data rate aggregation and topology aggregation, address aggregation is directional and associated with an aggregation point at a particular interface and not with every interface on the node. The direction of data aggregation 239 is indicated by an arrow in FIG. 2C. Interface 232*c* is the aggregation point interface on node 230. Address data received at interface 232*a* is output through interface 232*b* without aggregation. Similarly, address data received at interface 222*b* is output through interface 222*a* without aggregation, In other embodiments, data aggregation is also performed at a node for multiple directions, and different interfaces are aggregation points for different flow directions.

3.0 Method

According to various embodiments, a network of leaf nodes, transit nodes and communication links is evaluated or modified or both based on a measure of aggregation.

FIG. 3 illustrates an example method 300 to evaluate and improve data aggregation in a network. Although steps in FIG. 3 and any subsequent flow charts are shown in a particular order for purposes of illustration, in other embodiments, one or more steps may be performed in a different order or overlapping in time, in series or in parallel, or one or more steps may be omitted or added, or changed in some combination of ways. In some embodiments, method 300 is implemented on a general purpose computer, such as a network management system computer; in some embodiments method 300 is implemented on a router that receives topology information for all other routers in a network to be evaluated.

In step 310, topology data is received. The topology data indicates communication links and nodes that interface with those links. The topology data also indicates the leaf nodes. A leaf node is either an intermediate network node that has a communication link with only one other intermediate network node, or an intermediate network node that is so marked as a leaf node, such as stub routers that are not used for routing data packets to other routers. For purposes of illustration, it is assumed that the topology data indicates the communication links 133 and nodes 120 of network 103 described in reference to FIG. 1C.

Any method may be used to receive this data. For example, in various embodiments, the data is included as a default value in software instructions, is received as manual input from a person on a local or a remote node, is retrieved from a local file or database, or is sent from a different node on a network, either in response to a query or unsolicited, or the data is received using some combination of these methods. In various embodiments, the person manually inputting the data is a network design trainee or a network certification instructor for a hypothetical network, or a network administrator or consultant for an actual network.

In step 312, aggregation data is received. The aggregation data indicates aggregation interfaces that output aggregated data for a particular type of aggregation. For purposes of illustration, it is assumed that the type of aggregation is topology aggregation performed by OSPF level 2 routers between areas. The first aggregation point 151 is the interface between node 122*b* and link 130*n* for topology data that describes an area A that includes node 122*b*, node 122*d*, node 122*e*, node 121*a* and node 121*b*. The second aggregation point 152 is the interface between node 122*c* and link 130*n* for topology data that describes area B that includes node 122*c*, node 122*f*, node 122*g*, node 121*c* and node 121*d*.

In step 320 a set of paths is determined that includes one path for each pair of leaf nodes. Any method may be used to select the path. For example, an open shortest path first algorithm is used or a cost metric minimization method is used. For purposes of illustration, it is assumed that all communications links involve the same cost and the lowest cost path is selected for each pair of leaf nodes. The resulting set of twelve (12) paths determined during step 320 for the network 103 is listed in Table 1. The portion of the path that pass through an aggregation point in the direction of aggregation is underlined. The aggregation point is listed in the third column.

TABLE 1

Set of paths for leaf nodes in network 102.

| Leaf node pair | Path | Aggregation point passed in aggregation direction |
|---|---|---|
| 121a > 121b | 121a – 122d – 122e – 121b | |
| 121a < 121b | 121b – 122e – 122d – 121a | |
| 121a > 121c | 121a – 122d – <u>122b – 122c</u> – 122f – 121c | First (151) |
| 121a < 121c | 121c – 122f – <u>122c – 122b</u> – 122d – 121a | Second (152) |
| 121a > 121d | 121a – 122d – <u>122b – 122c</u> – 122g – 121d | First (151) |
| 121a < 121d | 121d – 122g – <u>122c – 122b</u> – 122d – 121a | Second (152) |
| 121b > 121c | 121b – 122e – <u>122b – 122c</u> – 122f – 121c | First (151) |
| 121b < 121c | 121c – 122f – <u>122c – 122b</u> – 122e – 121b | Second (152) |
| 121b > 121d | 121b – 122e – <u>122b – 122c</u> – 122g – 121d | First (151) |
| 121b < 121d | 121d – 122g – <u>122c – 122b</u> – 122e – 121b | Second (152) |
| 121c > 121d | 121c – 122f – 122g – 121d | |
| 121c < 121d | 121d – 122g – 122f – 121c | |

In step 330, a measure of aggregation is determined based on a number of aggregated paths that pass through an aggregation point within the set of paths. During step 330, aggregation paths are identified among the set of paths. This portion of step 330 may be done in parallel with step 320 to determine the paths, in some embodiments. For example, the paths between 121*a* and 121*b* do not pass through the aggregation points 151 or 152, therefore the paths between 121*a* and 121*b* are not aggregated paths. The path from 121*a* to 121*c* passes through aggregation point 151 in the aggregation direction (output), therefore the path from 121*a* to 121*c* is an aggregated path. The return path from 121*c* to 121*a* passes through aggregation point 152 in the aggregation direction (output), therefore the path from 121*c* to 121*a* is an aggregated path. Note that if only aggregation point 151 were employed, the return path would go through the point 151 as input which is not in the aggregation direction, and path 121*c* to 121*a* would not have been an aggregated path.

The measure of aggregation is based on the number of aggregated paths. As can be seen from Table 1, there are eight (8) aggregated paths among the set of 12 paths. Because the costs and aggregation points are symmetric in the illustrated example, the set of paths and aggregation paths could be determined for one direction and the results doubled for the return direction. In this case there are six (6) pairs of leaf nodes, disregarding direction, of which four (4) are connected by aggregated paths.

In some embodiments, the measure of aggregation is the ratio of the number of aggregated paths to the total number of paths in the set of paths. In the illustrated example, this ratio is 8:12 which can be expressed as a fraction ⅔, a decimal 0.66667, or a percentage 67%. In the following, the measure of aggregation is expressed as a percentage.

In some embodiments, some paths are more important than others. For example, some paths carry a larger share of the traffic. Thus, in some embodiments, the measure of aggregation depends on a weighted number of aggregated paths. For example, each aggregated path is weighted by the fraction of the actual or expected traffic to be carried by that path. For example, the measure of aggregation (MA) is given by Equation 1.

$$MA = [\Sigma_i w_i * A_i] / [\Sigma_i w_i] \quad (i=1, NP) \qquad (1)$$

where NP is the number of paths, $A_i$ is one if the ith path is an aggregated path and zero if the ith path is not an aggregated path, and $w_i$ is the weight assigned to the ith path. In the previous embodiment, $w_i = 1$ for all i. In an illustrated example, wi is the fraction of total traffic that takes a path. By definition $\Sigma_i$ wi=1. Equally distributed traffic provides weights of 1/12 (0.0833) for each path which leads to the same result of MA=67%. However, if it is assumed for purposes of illustration that non-aggregated path from 121a to 121b takes half the traffic (w=0.5), and the remaining 11 paths evenly distribute the rest (i.e., have weights of 0.04545), then

MA=8*0.04545=36%.

In contrast, if aggregated path 121a to 121c takes half the traffic, then

MA=0.5+7*0.04545=82%.

In other embodiments, other weighing factors are used.

In step 340, the network is evaluated based on the measure of aggregation. Too little aggregation is considered undesirable. For example, it is assumed for purposes of illustration that link 130k is re-introduced into network 103 with the first aggregation point 151 and second aggregation point 152. Then all paths between leaf nodes will use the link 130k and avoid the aggregation points. The measure of aggregation, MA, becomes zero. None of the best paths between leaf nodes uses the aggregation point. This is a poor network design.

Too much aggregation is also undesirable. For example, it is assumed for purposes of illustration that hierarchical network 101 has four aggregation points: two on node 122b at interfaces with link 130d and link 130e; and two on node 122c at interfaces with link 130f and link 130g. This effectively divides network 101 into four areas; a first area with node 122b, node 122d and node 121a; a second area with node 122b, node 122e and node 121b; a third area with node 122c, 122f and 121c; and a fourth area with node 122c, 122g, 121d. Then all paths between leaf nodes go through an aggregation point in the direction of aggregation. The measure of aggregation, MA, becomes 1 (100%). An excessive number of areas have been defined. This is also a poor network design.

According to one embodiment, a good design grade is computed based on the MA ratio during step 340, as listed in Table 2.

TABLE 2

Example design grade based on measure of aggregation.

| MA range | Network design grade |
|---|---|
| 0% to 30% | Poor |
| 30% to 50% | Good |
| 50% to 75% | Very Good |
| 75% to 85% | Good |
| 85% to 100% | Poor |

In some embodiments, during step 340, this network design grade is conferred on an engineer attempting to be certified for network design based on a hypothetical network offered as provided as part of a report analyzing an actual network. In some embodiments, step 340 is omitted.

In the illustrated embodiments, method 300 includes step 350 to modify the network based on the measure of aggregation. For example, the link 130k is removed from network 103 to increase the measure of aggregation from 0 to 67%. In some embodiments, step 350 includes making several changes to the network design and selecting the one modification that give a measure of aggregation closest to a target measure of aggregation (e.g., 65%). Then an actual network is changed to conform to the design that gives the measure of aggregation closest to the target measure of aggregation. In some embodiments, step 350 is omitted.

4.0 Implementation Mechanisms—Hardware Overview

Figure 4:
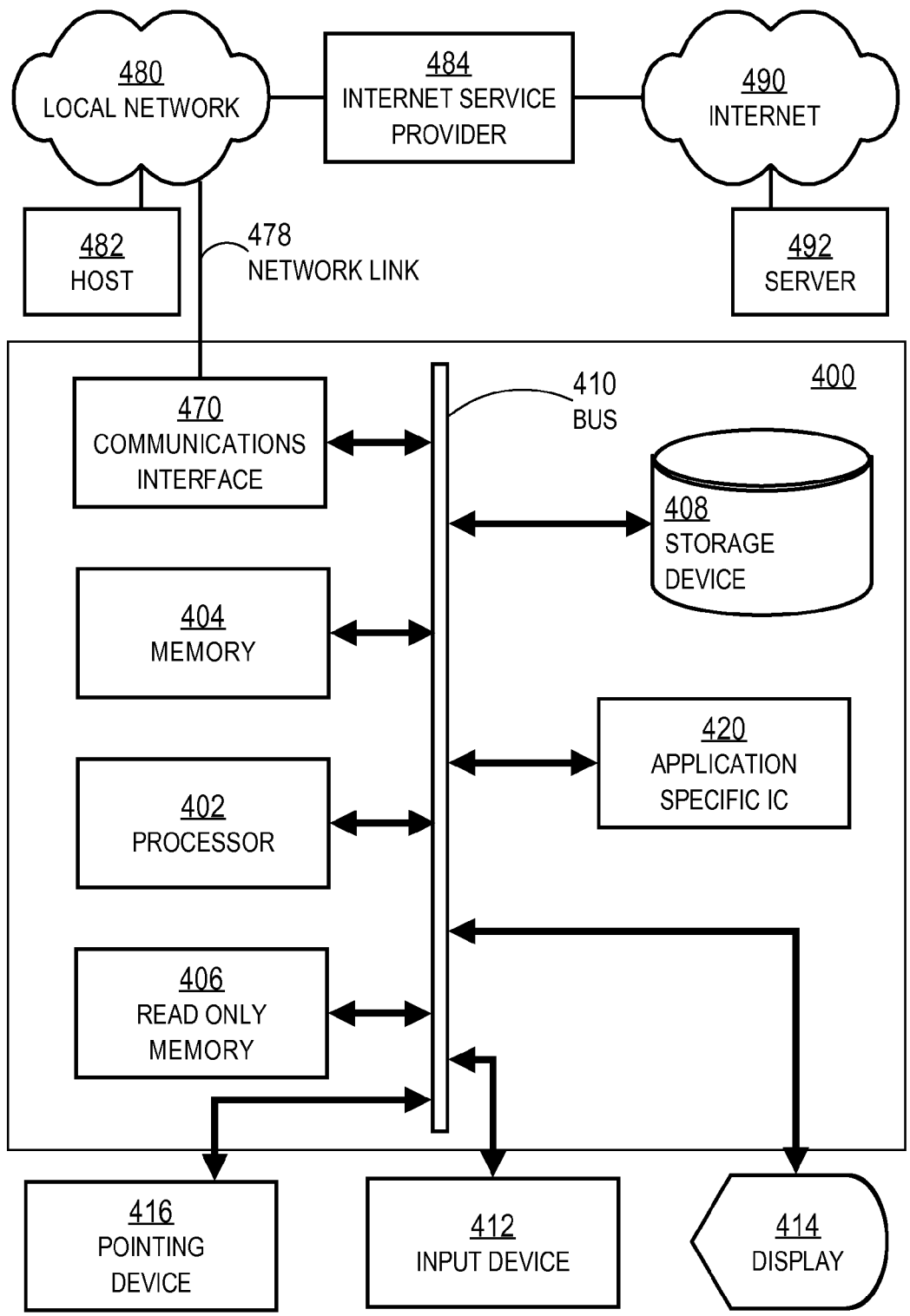
FIG. 4 illustrates a computer system upon which an embodiment of the invention may be implemented.

FIG. 4 illustrates a computer system 400 upon which an embodiment of the invention may be implemented.

Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitutes computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, that carry information streams, such as digital data.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, and fiber optic cables.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, or any other medium from which a computer can read.

Network link 478 typically provides information communication through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides information representing video data for presentation at display 414.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

Computer system 400 can send and receive information, including program code, through the networks 480, 490 among others, through network link 478 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received, or may be stored in storage device 408 or other non-volatile storage for later execution, or both.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

In some embodiments, computer system 400 is configured as a router; and each of one or more ASIC 420 is configured as a switching system with one or more communications interfaces, like communications interface 470, and network links, like network link 478, to one or more local networks, like local network 480. In a computer system configured as a router, it is common to omit one or more human interface devices, such as pointing device 416, input device 412, and display 414.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
receiving topology data that indicates a plurality of communication links and a plurality of intermediate network nodes in communication based on the plurality of communication links, wherein the plurality of intermediate network nodes includes a plurality of leaf nodes that terminate communications and a plurality of transit nodes that facilitate the passage of information between leaf nodes;

receiving aggregation point data that indicates all aggregation points on the plurality of intermediate network nodes, wherein an aggregation point is an interface between a network node and a communication link, which interface outputs data that is a combination of data received through a plurality of different interfaces;

determining a set of paths, wherein each path in the set connects a different pair of leaf nodes; and determining a measure of aggregation, for a network, based on a number of aggregated paths of the set of paths;

wherein an aggregated path passes through an aggregation point;

wherein determining the measure of aggregation further comprises determining a ratio of the number of aggregated paths to a number of paths in the set of paths;

wherein the method is performed by one or more processors.

2. A method as recited in claim 1, further comprising evaluating, based on the measure of aggregation, the network that consists of the plurality of communication links and the plurality of intermediate network nodes and all the aggregation points.

3. A method as recited in claim 2, further comprising the step of determining that a network, consisting of the plurality of communication links, the plurality of intermediate network nodes and all the aggregation points, is less able to find shortest routes as the ratio increases toward a value of one.

4. A method as recited in claim 2, further comprising the step of determining that a network, consisting of the plurality of communication links, the plurality of intermediate network nodes and all the aggregation points, is less able to scale to large numbers of intermediate network nodes as the ratio decreases toward a value of zero.

5. A method as recited in claim 2, further comprising the step of determining that a network, consisting of the plurality of communication links, the plurality of intermediate network nodes and all the aggregation points, is well designed when the ratio has a value in a range from about 0.5 to about 0.7.

6. A method as recited in claim 1, further comprising the step of modifying a network consisting of the plurality of communication links and the plurality of intermediate network nodes and all the aggregation points based on the measure of aggregation.

7. A method as recited in claim 1, wherein an aggregation point is an interface that outputs data at a maximum data rate that is greater than a maximum data rate on each of a plurality of different interfaces on the same node.

8. A method as recited in claim 1, wherein an aggregation point is an interface that outputs network address reachability data that is a combination of network address reachability data received through a plurality of different interfaces on one or more nodes and does not output data that indicates the plurality of different interfaces on the one or more nodes.

9. A method as recited in claim 1, wherein an aggregation point is an interface that outputs network address reachability data that is a combination of network address reachability data received through a plurality of different interfaces and does not output data that indicates the plurality of different interfaces.

10. A method as recited in claim 1, wherein an aggregation point is an interface that outputs a single network address range that is a combination of multiple network addresses received through a plurality of different interfaces.

11. A method as recited in claim 1, said step of determining the measure of aggregation further comprising weighting each path that connects two different leaf nodes by a portion of data traffic to be carried by that path.

12. A method as recited in claim 1, said step of determining a measure of aggregation further comprising determining a measure of aggregation wherein an aggregated path passes through an aggregation point in a direction of aggregation.

13. An apparatus comprising:
one or more processors;
means for receiving topology data that indicates a plurality of communication links and a plurality of intermediate network nodes in communication based on the plurality of communication links, wherein the plurality of intermediate network nodes includes a plurality of leaf nodes that terminate communications and a plurality of transit nodes that facilitate the passage of information between leaf nodes;
means for receiving aggregation point data that indicates all aggregation points on the plurality of intermediate network nodes, wherein an aggregation point is an interface between a network node and a communication link, which interface outputs data that is a combination of data received through a plurality of different interfaces;
means for determining a set of paths, wherein each path in the set connects a different pair of leaf nodes; and
means for determining a measure of aggregation, for a network, based on a number of aggregated paths of the set of paths;
wherein an aggregated path passes through an aggregation point;
wherein determining the measure of aggregation further comprises determining a ratio of the number of aggregated paths to a number of paths in the set of paths.

14. A computer-readable volatile or non-volatile storage medium storing one or more sequences of machine-readable instructions that, when executed by one or more processors, cause the one or more processors to perform steps that comprise:
receiving topology data that indicates a plurality of communication links and a plurality of intermediate network nodes in communication based on the plurality of communication links, wherein the plurality of intermediate network nodes includes a plurality of leaf nodes that terminate communications and a plurality of transit nodes that facilitate the passage of information between leaf nodes;
receiving aggregation point data that indicates all aggregation points on the plurality of intermediate network nodes, wherein an aggregation point is an interface between a network node and a communication link, which interface outputs data that is a combination of data received through a plurality of different interfaces;
determining a set of paths, wherein each path in the set connects a different pair of leaf nodes; and
determining a measure of aggregation, for a network, based on a number of aggregated paths of the set of paths;
wherein an aggregated path passes through an aggregation point;
wherein determining the measure of aggregation further comprises determining a ratio of the number of aggregated paths to a number of paths in the set of paths.

15. The computer-readable storage medium of claim 14, further storing instructions, which when executed, cause the one or more processors to perform evaluating, based on the measure of aggregation, the network that consists of the plurality of communication links and the plurality of intermediate network nodes and all the aggregation points.

16. The computer-readable storage medium of claim 15, further storing instructions, which when executed, cause the one or more processors to perform determining that a network, consisting of the plurality of communication links, the plurality of intermediate network nodes and all the aggregation points, is less able to find shortest routes as the ratio increases toward a value of one.

17. The computer-readable storage medium of claim 15, further storing instructions, which when executed, cause the one or more processors to perform determining that a network, consisting of the plurality of communication links, the plurality of intermediate network nodes and all the aggregation points, is less able to scale to large numbers of intermediate network nodes as the ratio decreases toward a value of zero.

18. The computer-readable storage medium of claim 15, further storing instructions, which when executed, cause the one or more processors to perform determining that a network, consisting of the plurality of communication links, the plurality of intermediate network nodes and all the aggregation points, is well designed when the ratio has a value in a range from about 0.19 to about 0.21.

19. The computer-readable storage medium of claim 14, further storing instructions, which when executed, cause the one or more processors to perform modifying a network consisting of the plurality of communication links and the plurality of intermediate network nodes and all the aggregation points, based on the measure of aggregation.

20. The computer-readable storage medium of claim 14, wherein an aggregation point is an interface that outputs data at a maximum data rate that is greater than a maximum data rate on each of a plurality of different interfaces on the same node.

21. The computer-readable storage medium of claim 14, wherein an aggregation point is an interface that outputs network address reachability data that is a combination of network address reachability data received through a plurality of different interfaces on one or more nodes and does not output data that indicates the plurality of different interfaces on the one or more nodes.

22. The computer-readable storage medium of claim 14, wherein an aggregation point is an interface that outputs network address reachability data that is a combination of network address reachability data received through a plurality of different interfaces and does not output data that indicates the plurality of different interfaces.

23. The computer-readable storage medium of claim 14, wherein an aggregation point is an interface that outputs a single network address range that is a combination of multiple network addresses received through a plurality of different interfaces.

24. The computer-readable storage medium of claim 14, wherein the instructions, which when executed, cause the one or more processors to perform determining the measure of aggregation further comprise instructions, which when executed, cause the one or more processors to further perform weighting each path that connects two different leaf nodes by a portion of data traffic to be carried by that path.

25. The computer-readable storage medium of claim 14, wherein the instructions, which when executed, cause the one or more processors to perform determining a measure of aggregation further comprise instructions, which when executed, cause the one or more processors to further perform determining a measure of aggregation wherein an aggregated path passes through an aggregation point in a direction of aggregation.

* * * * *